United States Patent
Ekkizogloy et al.

(10) Patent No.: US 8,582,974 B2
(45) Date of Patent: Nov. 12, 2013

(54) INTER-TRANSCEIVER MODULE COMMUNICATION FOR FIRMWARE UPGRADE

(75) Inventors: Luke M. Ekkizogloy, San Jose, CA (US); Jayne C. Hahin, Cupertino, CA (US); Lucy G. Hosking, Santa Cruz, CA (US); Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 13/367,268

(22) Filed: Feb. 6, 2012

(65) Prior Publication Data

US 2012/0134680 A1     May 31, 2012

Related U.S. Application Data

(62) Division of application No. 11/241,086, filed on Sep. 30, 2005, now Pat. No. 8,111,999.

(60) Provisional application No. 61/623,256, filed on Oct. 29, 2004.

(51) Int. Cl.
    *H04B 10/00*      (2013.01)

(52) U.S. Cl.
    USPC .................... 398/135; 398/136; 398/138

(58) Field of Classification Search
    USPC ...................................... 398/135–139
    See application file for complete search history.

(56) References Cited

U.S. PATENT DOCUMENTS

| | | | |
|---|---|---|---|
| 5,850,305 A * | 12/1998 | Pidgeon | 398/193 |
| 7,107,414 B2 * | 9/2006 | Hidai et al. | 711/154 |
| 7,154,924 B2 * | 12/2006 | Sanchez | 372/29.02 |
| 2005/0232643 A1 * | 10/2005 | Aronson et al. | 398/183 |

* cited by examiner

*Primary Examiner* — Dzung Tran
(74) *Attorney, Agent, or Firm* — Maschoff Brennan

(57) ABSTRACT

An operational optical transceiver configured to update operational firmware using an optical link of the transceiver. The optical transceiver includes at least one processor and a system memory capable of receiving firmware. The optical transceiver receives an optical signal over the optical link containing the update firmware. The optical transceiver then recovers the firmware from the optical signal. Finally, the optical transceiver provides to the system memory the recovered firmware, which when executed by the at least one processor alters the operation of the transceiver.

18 Claims, 2 Drawing Sheets

INTER-TRANSCEIVER MODULE COMMUNICATION FOR FIRMWARE UPGRADE

CROSS-REFERENCE TO RELATED APPLICATIONS

This application is a divisional of U.S. patent application Ser. No. 11/241,086, filed Sep. 30, 2005, which claims the benefit of U.S. Provisional Application No. 60/623,256, filed Oct. 29, 2004, both applications which are incorporated herein by reference in its entirety.

BACKGROUND OF THE INVENTION

1. The Field of the Invention

The present invention relates generally to optical transceivers. More specifically, the present invention relates to upgrading operational firmware in an optical transceiver using an optical link.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

Controllers are typically implemented in hardware as state machines. Their operation is fast, but inflexible. Being primarily state machines, the functionality of the controller is limited to the hardware structure of the controller. What would be advantageous are controllers that have more flexibility to change their functionality.

BRIEF SUMMARY OF THE INVENTION

The forgoing problems with the prior state of the art are overcome by the principles of the present invention, which relate to an optical transceiver configured to receive firmware updates using its optical link. The optical transceiver includes at least one processor and a system memory. The system memory is configured to receive firmware over the optical link that, when executed by the processor, may alter the operation of the optical transceiver.

The optical transceiver receives an optical signal containing firmware from a source such as another optical transceiver, a host computing system, or a separate programming unit. The optical transceiver then recovers the firmware from the optical signal and provides the recovered firmware to the system memory. The optical transceiver, specifically the processor, may then execute the recovered firmware. As mentioned, the executed firmware is structured to alter the operation of the optical transceiver.

Accordingly, there are many advantages to the principles of the present invention. For example, the process removes the need to exclusively use an electrical link between the optical transceiver and a host computing system for firmware updates. This is especially useful for optical transceivers that may not have a direct electrical link with the host. In addition, the principles of the present invention allow for the updating of firmware to an optical transceiver that is installed in a remote or inaccessible location, such as an optical transceiver on the ocean floor.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an operational optical transceiver configured to update operational firmware using an optical link of the transceiver. The optical transceiver includes at least one processor and a system memory capable of receiving firmware. The optical transceiver receives an optical signal containing the update firmware over the optical link. The optical transceiver then recovers the firmware from the optical signal. Finally, the optical transceiver provides to the system memory the recovered firmware, which when executed by the at least one processor alters the operation of the transceiver. An example operational optical transceiver environment will first be described. Then, the operation in accordance with the invention will be described with respect to the operational environment.

Figure 1:
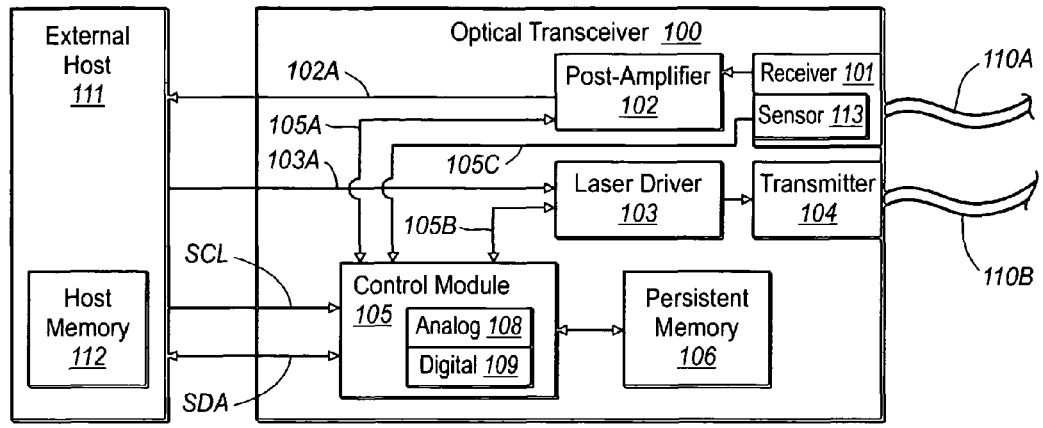
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
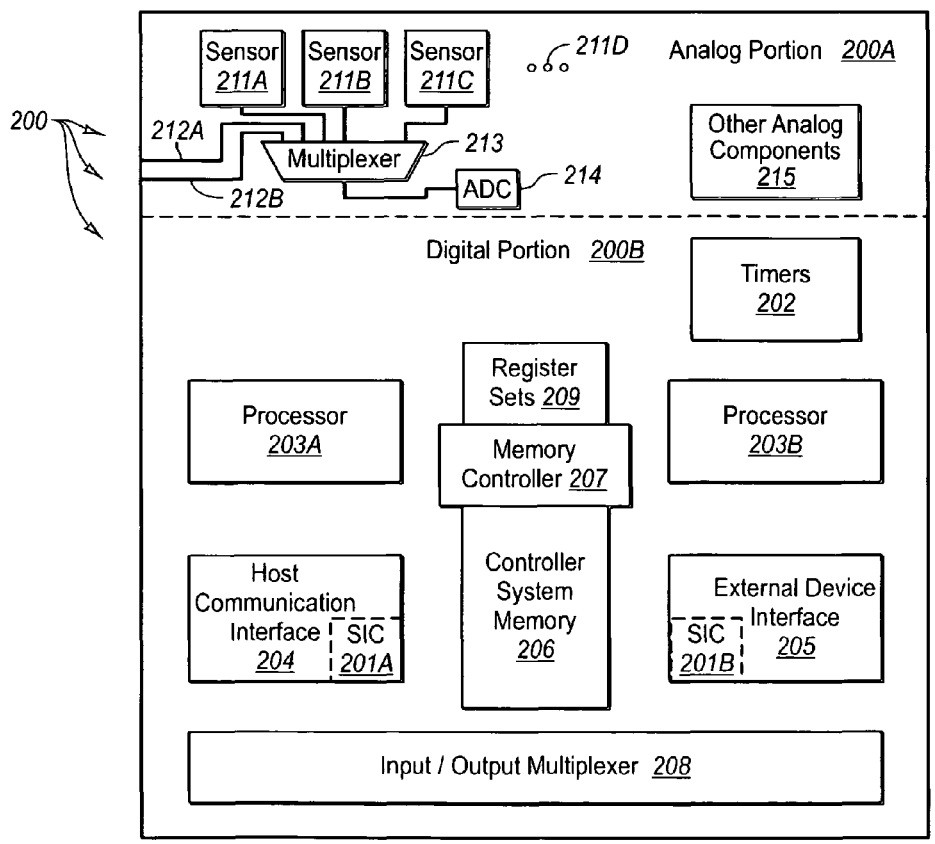
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write firmware generated data that controls high speed comparison in optical transceiver 100A. Alternatively, the registers may hold data selecting operational parameters for comparison. Additionally, the registers may be memory mapped to the various components of optical transceiver 100A for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. The principles of the present invention will be discussed with reference to the environment described in relation to FIGS. 1 and 2.

Accordingly, the principles of the present invention allow for using an optical link of the optical transceiver to update firmware, which when executed controls the operation of the optical transceiver. In the description and in the claims, "operation" is defined to mean the manner in which the optical transceiver communicates with the outside world and the manner in which the optical transceiver internally functions. In the description and in the claims, "firmware" is defined to mean any type of operational or control code, such as, but not limited to, microcode and software, that runs on a microprocessor and controls the operation of the transceiver when executed.

The updated firmware is received over the optical link and then provided to system memory for execution. In the description and in the claims, "system memory" is defined to mean RAM such as controller system memory 206, non-volatile memory such as persistent memory 106, a register, a processor, a flip-flop, and/or any other type of memory. The principles of the present invention thus enable efficient firmware updates of any optical transceiver regardless of the location of the transceiver or the transceiver's distance from the host.

There may be many different types of update firmware available. A user may desire to update transceiver operational firmware. This firmware may direct, when executed, how transceiver 100 communicates with the outside world and how transceiver 100 performs internal functions such as digital diagnostics. Alternatively, the user may desire to update firmware that when executed implements specific transceiver operational features such as off-transceiver logging or alarm settings. It may also be possible to update various other types of transceiver firmware.

Referring again to FIG. 1, a sensor 113 is shown coupled to receiver 101. Sensor 113 may be an out-of-band demodulator, a filter, a photo-diode, or any other type of device capable of detecting and processing an optical or electrical signal.

Figure 3:
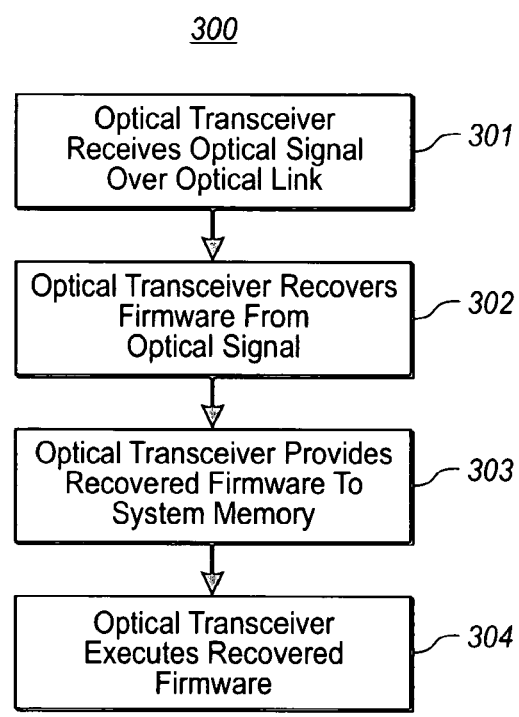
FIG. 3 illustrates a flowchart of a method for an optical transceiver to use an optical link to alter its operation.

Referring to FIG. 3, a flowchart of a method 300 for altering the operation of an optical transceiver through the use of an optical link is illustrated. First, an optical transceiver receives an optical signal over the optical link (act 301). This signal may be received from another optical transceiver that is coupled to the optical transceiver by an optical link, a host computing system coupled to the optical transceiver by an optical link, or a programming unit coupled to the optical transceiver by an optical link.

In one embodiment illustrated with respect to FIGS. 1 and 2, transceiver 100 receives an optical signal over fiber 110A that is double modulated to contain a high-speed communication signal and a lower frequency out-of-band signal containing update firmware. This optical signal may be produced by a variety of sources. For example, a remote transceiver control module may modulate the out-of-band signal comprising the update firmware onto the high-speed communication signal. The modulation may be accomplished by any modulation technique known to one skilled in the art. The out-of-band signal may be modulated at a frequency that is much slower than the high-speed signal. The double modulated signal is then converted to an optical signal by the remote transceiver's transmitter and transmitted to transceiver 100.

Alternatively, the out-of-band signal containing the update firmware may be modulated onto a high-speed communication signal by host 111 or by a special programming unit that is connected directly to the optical link. The special programming unit may be capable of producing both the high-speed communication signal and modulating the out-of-band signal comprising the update firmware onto the high speed signal.

Referring again to the method of FIG. 3, the optical transceiver recovers update firmware contained in the optical signal (act 302). The recovery of the update firmware may be accomplished by use of a sensor that is configured to detect the firmware and recover it from the optical signal. Examples of such a sensor include, but are not limited to, a demodulator, a filter, a photo-diode, or any other sensor capable of reading an electric or optical signal. The update firmware may be recovered from the optical signal by any other method known to those skilled in the art.

Returning again to the embodiment illustrated with respect to FIGS. 1 and 2, fiber 110A may send the doubled modulated signal to receiver 101 where the double modulated signal is converted to an electrical signal. The post-amplifier 102 extracts the high speed communication signal and may send it to host 111 as previously described. However, sensor 113, which in this case may be an out-of-band demodulator, may recover the update firmware by demodulating the out-of-band signal from the high speed communication signal. Sensor 113 may then send the recovered update firmware to control module 105 over line 105C for further processing. Sensor 113 may be an out-of-band demodulator such as the one described in commonly assigned co-pending U.S. patent application Ser. No. 10/824,258, filed Apr. 14, 2004, which is incorporated herein by reference.

In a second embodiment of the present invention, a firmware update may also be accomplished by receiving an optical signal over the optical link. In this case, an optical signal is produced that comprises two components. This signal may be produced by the control module of a remote transceiver, the host 111, or the special programming unit described above. The first component of the signal would consist of alternating binary ones and zeroes. This signal may alert transceiver 100, specifically control module 105, that a firmware update is about to occur.

The second component of the optical signal may be a low frequency signal comprising a long series of binary ones followed by a long series of binary zeroes repeated multiple times. The long series of binary ones and zeroes may comprise the update firmware. In a normal signal, sensor 113, which may be a filter in this case, would not expect to see more than a few binary ones or a few binary zeroes in a row. In this case, sensor 113 may detect the long rows of binary ones and zeroes and may filter them out of the optical signal. Sensor 113 may send the binary ones and zeroes to control module 105 as the binary numbers are filtered out of the signal.

In a third embodiment of the present invention, optical transceiver 100 may receive a high speed optical signal comprising various binary ones and zeroes. This signal may also include update firmware. The signal may create a frequency spectrum with a number of frequency harmonics. One of the harmonics at a designated frequency may have a binary 1 or a binary 0 encoded on it. For example, when the optical signal comprises binary ones, the encoded harmonic may also include a binary 1. Conversely, when the optical signal comprises binary zeroes, the encoded harmonic may include a binary 0. Sensor 113, which in this embodiment may be a filter, may filter out each of the binary ones or zeroes from the encoded harmonic. As each bit is filtered out, it may be provided to control module 105 over connection 105C for further processing.

The optical transceiver then provides the recovered update firmware to the system memory (act 303). For example, referring again to FIGS. 1 and 2, the recovered update firmware, regardless of which embodiment was implemented to recover the firmware from the optical signal, is sent to control module 105 over connection 105C, which is represented by lines 212A and 212B in FIG. 2. The recovered update firmware is then provided to controller system memory 206 for execution.

In some embodiments, transceiver 100 may contain dedicated loader firmware, either in persistent memory 106 or a memory location of control module 105 such as register sets 209 or controller system memory 106, which is structured to assist in the loading of the update firmware. This dedicated loader firmware may be executed by processors 203. The loader firmware may direct processors 203 to check the received update firmware for errors. If no errors are found, the loader firmware may further direct processors 203 to execute the new firmware or to load the firmware into persistent memory 106 for later execution. In embodiments without the loader firmware, the update firmware may be directly executed by processors 203 or loaded to persistent memory 106 for later execution.

Referring again to the method 300 of FIG. 3, the updated firmware is executed by the optical transceiver (act 304). The executed firmware may alter the operation of transceiver 100 in different ways depending on the type of update firmware that is executed. For example, suppose that the update firmware was structured to update the operational firmware. The firmware would be provided to persistent memory 106 where it would overwrite some or all of the existing operational firmware. When executed by processors 203, the new operational firmware would alter the operation of transceiver 100 by changing operational parameters such as how to transmit and receive optical data. Alternatively, the executed update firmware may cause transceiver 100 to implement a specific feature such as off-transceiver logging of operational parameters.

Accordingly, the principles of the present invention relate to an operational optical transceiver configured to update operational firmware using the optical link. The optical transceiver receives an optical signal over an optical link containing the update firmware. The optical transceiver then recovers the update firmware from the optical signal. Finally, the optical transceiver provides the recovered firmware to the system memory where the processors may execute the firmware. This process removes the need to exclusively use the electrical link to provide update firmware to the transceiver. In addition, the principles of the present invention provide a way that allows for updating firmware to a transceiver that is not easily accessible or are located a long distance from the host, such as a transceiver on the ocean floor. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver comprising:
   a system memory;
   at least one processor programmed to execute firmware stored in the system memory, the executed firmware structured to at least partially control the operation of the optical transceiver;
   wherein the optical transceiver is configured to alter its operation by:
   receiving an optical signal over an optical link;
   recovering firmware from the optical signal, wherein the recovered firmware is structured such that, when executed by the at least one processor, the operation of the optical transceiver is altered;
   providing the recovered firmware to system memory; and
   executing the recovered firmware, wherein the optical transceiver further comprises a filter configured to filter out firmware encoded in a frequency harmonic of the optical signal.

2. An optical transceiver in accordance with claim 1, wherein the optical transceiver is one of a 1G laser transceiver, a 2G laser transceiver, a 4G laser transceiver, a 8G laser transceiver, or a 10G laser transceiver.

3. An optical transceiver in accordance with claim 1, wherein the optical transceiver is a laser transceiver suitable for fiber optic links greater than 10G.

4. An optical transceiver in accordance with claim 1, wherein the optical transceiver is one of a XFP laser transceiver, a SFP laser transceiver, or a SFF laser transceiver.

5. An optical transceiver in accordance with claim 1, wherein the at least one processor is further programmed to execute loader firmware to check the recovered firmware for errors prior to executing the recovered firmware.

6. An optical transceiver in accordance with claim 1, wherein the optical transceiver includes loader firmware that is structured to assist in providing the recovered firmware to the system memory and assist in executing the recovered firmware.

7. An optical transceiver in accordance with claim 1, wherein executing the recovered firmware alters how the optical transceiver transmits and receives optical data.

8. An optical transceiver in accordance with claim 1, wherein executing the recovered firmware implements a specific operational feature.

9. An optical transceiver in accordance with claim 8, wherein the specific operational feature includes off-transceiver logging of operational parameters.

10. An optical transceiver in accordance with claim 1, wherein the optical transceiver is further configured to store the recovered firmware in a non-volatile memory source that is separate from a control module that includes the system memory prior to executing the recovered firmware.

11. In an optical transceiver that includes system memory and one or more processors, a method for altering the operation of the optical transceiver using an optical link, the method comprising:

an act of the optical transceiver receiving an optical signal over the optical link, the optical signal containing both high-speed communication data and embedded harmonic firmware;

an act of the optical transceiver recovering firmware from the optical signal using a filter that filters the embedded harmonic firmware from the high-speed communication data prior to any post-amplification being performed on the high-speed communication data;

an act of the optical transceiver providing the recovered firmware to system memory; and an act of the one or more processors executing the recovered firmware, the recovered firmware being structured such that, when executed by the one or more processors, the operation of the optical transceiver is altered.

12. A method in accordance with claim 11, wherein the optical transceiver includes loader firmware that is structured to assist in providing the recovered firmware to the system memory and assist in the one or more processors executing of the recovered firmware.

13. A method in accordance with claim 11, wherein the operation of the optical transceiver is altered in how the optical transceiver transmits and receives optical data.

14. A method in accordance with claim 11, wherein the operation of the optical transceiver is altered in how the optical transceiver implements a specific operational feature.

15. A method in accordance with claim 14, wherein the specific operational feature includes off-transceiver logging of operational parameters.

16. A method in accordance with claim 11, wherein the optical transceiver receives the optical signal from one of another optical transceiver that is coupled to the optical transceiver by the optical link, a host computing system coupled to the optical transceiver by the optical link, or a programming unit coupled to the optical transceiver by the optical link.

17. A method in accordance with claim 11, further comprising an act of checking the recovered firmware for errors prior to the act of the one or more processors executing the recovered firmware.

18. A method in accordance with claim 11, further comprising an act of storing the recovered firmware in a non-volatile memory source that is separate from a control module that includes the system memory prior to the act of the one or more processors executing the recovered firmware.

* * * * *